US008230812B2

(12) United States Patent
Ross

(10) Patent No.: US 8,230,812 B2
(45) Date of Patent: Jul. 31, 2012

(54) APPARATUS TO PREVENT PETS CLIMBING A CHRISTMAS TREE

(76) Inventor: Nancy A. Ross, Pittsburgh, PA (US)

( * ) Notice: Subject to any disclaimer, the term of this patent is extended or adjusted under 35 U.S.C. 154(b) by 244 days.

(21) Appl. No.: 12/316,341

(22) Filed: Dec. 11, 2008

(65) Prior Publication Data

US 2009/0151650 A1 Jun. 18, 2009

Related U.S. Application Data

(60) Provisional application No. 61/007,216, filed on Dec. 11, 2007.

(51) Int. Cl.
*A01K 29/00* (2006.01)
*A01D 46/22* (2006.01)
(52) U.S. Cl. ............... 119/174; 47/31; 56/329
(58) Field of Classification Search ............ 119/174, 119/471, 479, 469, 532, 531, 533, 52.3, 432; 47/23.1, 23.2, 72, 20.1, 31, 32.4, 32; 56/329; D8/1; D11/130
See application file for complete search history.

(56) References Cited

U.S. PATENT DOCUMENTS

| | | | | |
|---|---|---|---|---|
| 2,102,748 A * | 12/1937 | Rocquin | | 47/1.01 R |
| 2,999,479 A | 9/1961 | Carder | | |
| 3,249,140 A * | 5/1966 | Jackson | | 206/423 |
| 4,555,866 A | 12/1985 | Stone | | |
| 5,160,110 A | 11/1992 | Praegitzer | | |
| 5,575,242 A | 11/1996 | Davis et al. | | |
| 5,580,635 A * | 12/1996 | Hoheisel | | 428/66.1 |
| 5,593,743 A * | 1/1997 | Baker | | 428/18 |
| 6,191,693 B1 | 2/2001 | Sangsingkeow | | |
| D580,718 S * | 11/2008 | Smith | | D8/1 |
| D622,560 S * | 8/2010 | Kuhn et al. | | D8/1 |
| 2004/0112033 A1* | 6/2004 | Straatmans | | 56/329 |
| 2005/0263100 A1 | 12/2005 | Kover, Jr. et al. | | |
| 2005/0287337 A1 | 12/2005 | Proud | | |
| 2006/0180094 A1 | 8/2006 | Viggiano | | |
| 2009/0133323 A1* | 5/2009 | Farmer et al. | | 47/9 |

* cited by examiner

*Primary Examiner* — Kristen C Hayes
(74) *Attorney, Agent, or Firm* — James Ray & Assoc.

(57) ABSTRACT

An apparatus to prevent a pet climbing up a Christmas tree includes a screen member having a first predetermined shape and a first predetermined size. The screen member is formed from a pre-selected material. An aperture, having a second predetermined size, is formed through the screen member at a predetermined location for receiving therein a trunk of such Christmas tree. A slit is formed through the screen member beginning at an outer edge thereof and extending to an edge of a perimeter of such aperture to enable placing the screen member around the trunk. There is further a mechanism engageable with each of the screen member and a bottom branch of the Christmas tree for connecting such screen member to such Christmas tree beneath bottom the bottom branches thereof.

17 Claims, 3 Drawing Sheets

APPARATUS TO PREVENT PETS CLIMBING A CHRISTMAS TREE

CROSS REFERENCE TO RELATED APPLICATION

This patent application is closely related to U.S. Provisional Patent Application Ser. No. 61/007,216 titled "PET CHRISTMAS TREE SAVER" filed Dec. 11, 2007. The teachings in such U.S. Provisional Patent Application Ser. No. 61/007,216 are incorporated herein by reference thereto.

FIELD OF THE INVENTION

The present invention relates, in general, to Christmas trees and, more particularly, this invention relates to an apparatus to prevent a pet climbing up the branches of a Christmas tree.

BACKGROUND OF THE INVENTION

Prior to the conception and development of the present invention, as is generally well known in the prior art, pets, such as cats, like to climb up the branches of a Christmas tree. Oftentimes this will result in knocking some of the ornaments off such tree. These ornaments may be broken as a result of hitting something, such as the tree stand, as they fall.

Further when such pets climb a live tree they will oftentimes cause many of the needles on the branches to be dislodged thereby creating a mess. This is particularly the case as the tree dries out.

Applicant is aware of and incorporates herein by reference thereto the teachings of U.S. Pat. Nos. 2,999,479; 4,555,866; 5,160,110; 5,575,242 and 6,191,693. Further Applicant has reviewed U.S. Published Applications 2005/0263100; 2005/0287337 and 2006/0180094.

SUMMARY OF THE INVENTION

The present invention provides an apparatus to prevent a pet climbing up a Christmas tree. Such apparatus includes a screen member having a first predetermined shape and a first predetermined size. The screen member is formed from a pre-selected material. There is an aperture, having a second predetermined size, formed through the screen member at a predetermined location. This aperture receives therein a trunk of the Christmas tree. Additionally, a slit is formed through the screen member beginning at an outer edge thereof and extending to an edge of a perimeter of such aperture to enable placing the screen member around the trunk. Further there is a mechanism provided which engages each of the screen member and a bottom branch of the Christmas tree for connecting the screen member to such Christmas tree beneath the bottom branches thereof.

OBJECTS OF THE INVENTION

It is, therefore, one of the primary objects of the present invention to provide an apparatus to prevent pets climbing up the branches of a Christmas tree.

Another object of the present invention is to provide an apparatus to prevent pets climbing up the branches of a Christmas tree which will prevent decorations on the tree being disturbed.

Still another object of the present invention is to provide an apparatus to prevent pets climbing up the branches of a Christmas tree which is easy to install.

Yet another object of the present invention is to provide an apparatus to prevent pets climbing up the branches of a Christmas tree which is relatively inexpensive to manufacture.

An additional object of the present invention is to provide an apparatus to prevent pets climbing up the branches of a Christmas tree which can be reused.

Yet another object of the present invention is to provide an apparatus to prevent pets climbing up the branches of a Christmas tree which can be produced in a variety of sizes and from a number of different materials.

Another object of the present invention is to provide an apparatus which will prevent pets chewing on Christmas tree lights.

A further object of the present invention is to provide an apparatus for catching pine needles falling from a natural tree.

An additional object of the present invention is to provide an apparatus which will prevent pets from climbing on the tree.

In addition to the various objects and advantages of the present invention described with some degree of specificity above it should be obvious that additional objects and advantages of the present invention will become more readily apparent to those persons who are skilled in the relevant art from the following more detailed description of the invention, particularly, when such description is taken in conjunction with the attached drawing figures and with the appended claims.

Figure 1:
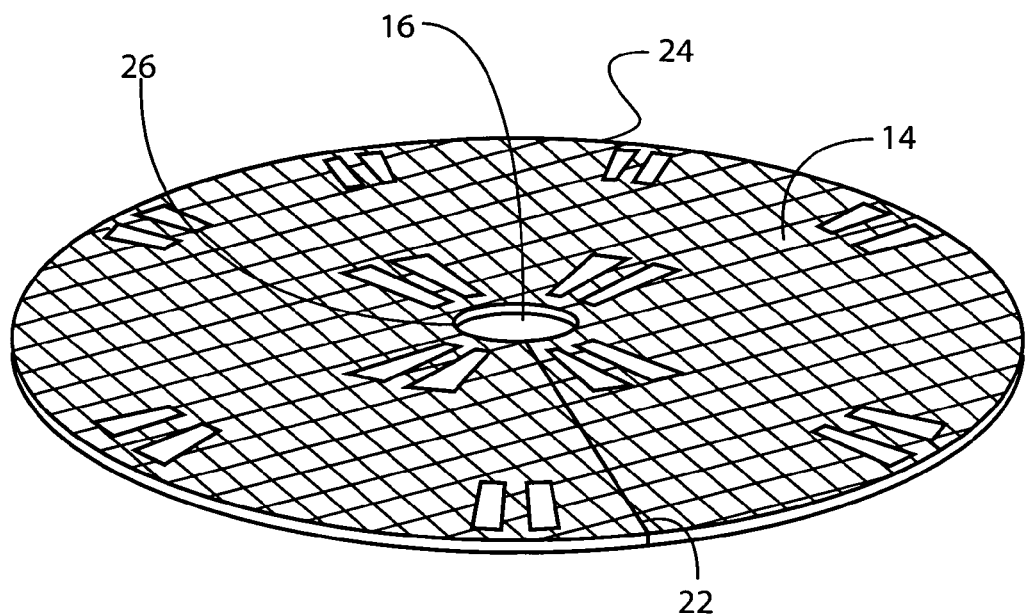
FIG. 1 is a plan view of a presently preferred embodiment of the screen portion of the apparatus to prevent a pet climbing the branches of a Christmas tree.

BRIEF DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

Figure 2:
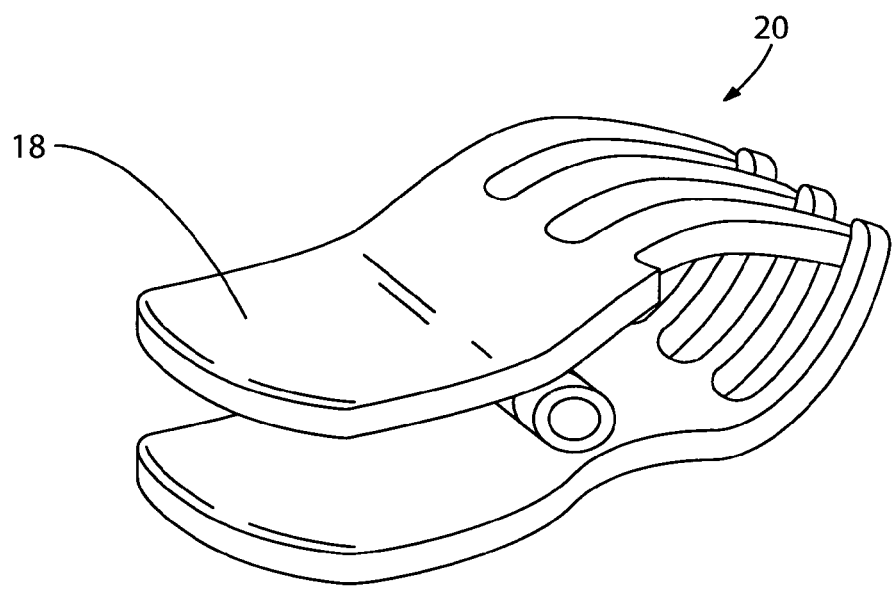
FIG. 2 is a perspective view illustrating a presently preferred embodiment of a clip means used to attach the screen to the bottom branches of such Christmas tree.
Figure 3:
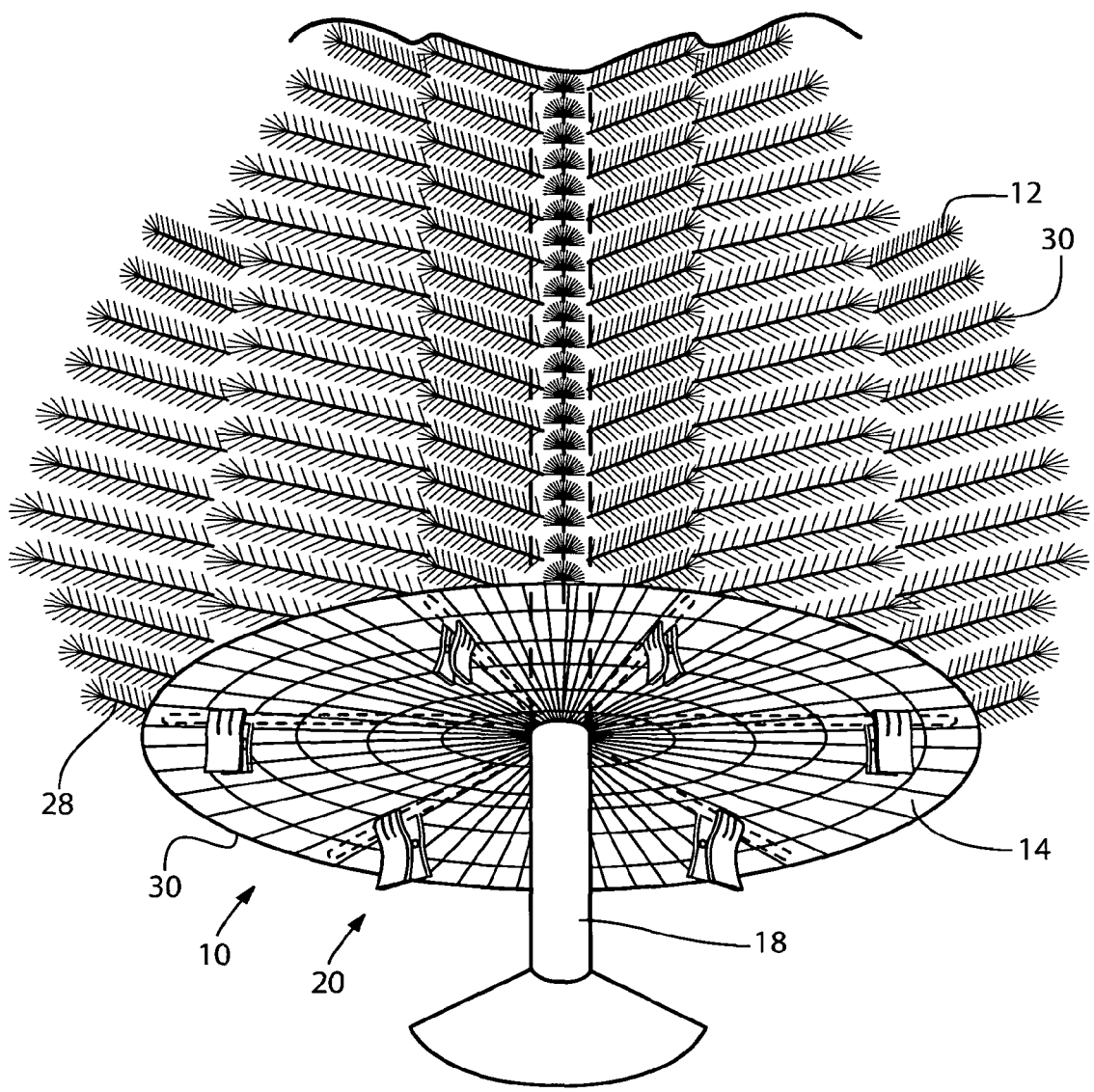
FIG. 3 is a view illustrating the screen attached to the bottom of the Christmas tree.
Figure 4:
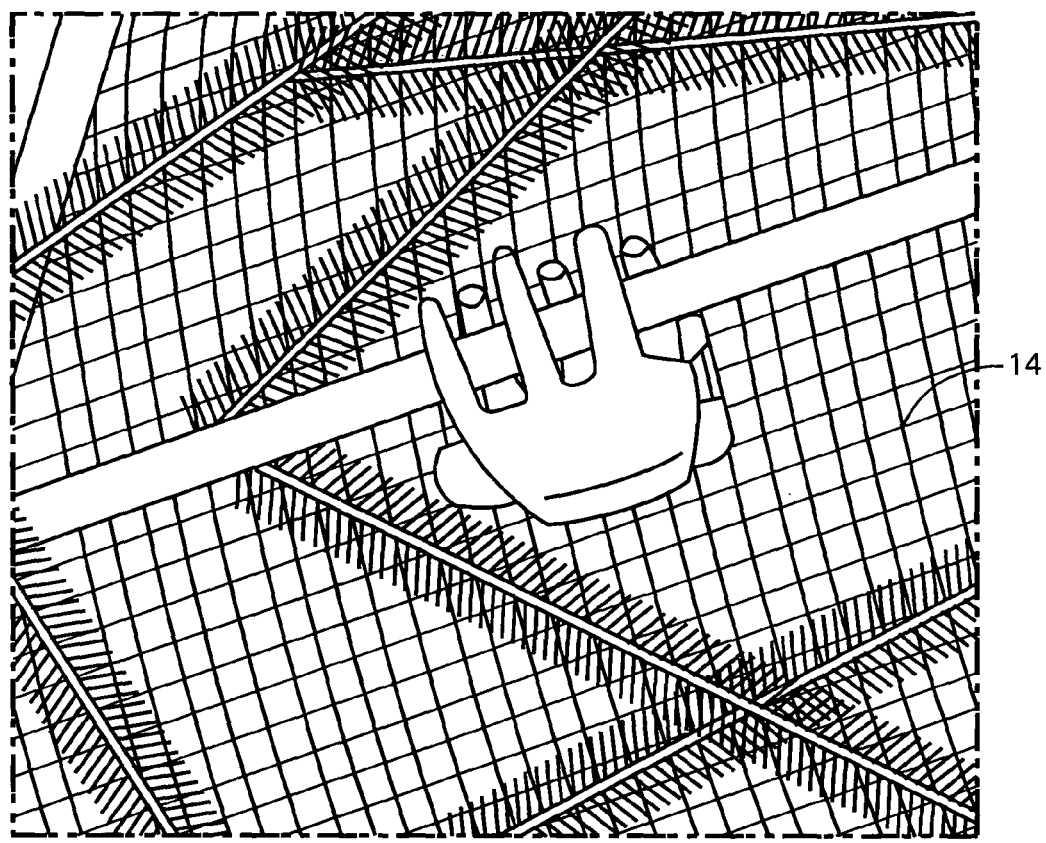
FIG. 4 is a view showing a clip means passing through the screen.

Reference is now made, more particularly, to FIGS. 1-4. Illustrated therein is a presently preferred embodiment of an apparatus, generally designated 10, to prevent a pet climbing up a Christmas tree 12. This apparatus 10 includes a screen member 14 having a first predetermined shape and a first predetermined size. The first predetermined shape is preferably selected from the group consisting of generally circular, generally hexagonal and generally octagonal with the most preferred first predetermined shape being generally circular. The first predetermined size is at least sufficient to extend closely adjacent an outer perimeter 30 of bottom branches 28 of such Christmas tree 12.

Additionally, the screen member 14 is formed from a pre-selected material. Preferably, the pre-selected material is selected from the group consisting of screen wire, netting, cloth and mesh. Such screen wire is selected from the group consisting of metal and plastic.

There is an aperture 16, having a second predetermined size, formed through the screen member 14 at a predetermined location for receiving therein a trunk portion 18 of such Christmas tree 12. The second predetermined size of such aperture 16 is at least sufficient to encircle such trunk 18 of the Christmas tree 12.

Further, there is a slit 22 formed through the screen member 14 beginning at an outer edge 24 thereof and extending to an outermost edge 26 of a perimeter of the aperture 16 to enable placing the screen member 14 around the trunk 18 of the Christmas tree 12.

Finally, there is a means, generally designated 20, engageable with each of the screen member 14 and a plurality of bottom branches 28 of such Christmas tree 12 for connecting the screen member 14 to such Christmas tree 12 beneath the bottom branches 28 thereof.

Such means 20 for connecting the screen member 14 to such Christmas tree 12 beneath the bottom branches 28 thereof is at least of clips 18, string, plastic ties and clamps.

The present invention further contemplated providing the apparatus 10 in combination with a decorated Christmas tree 12.

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

I claim:

1. An apparatus to prevent a pet climbing up a Christmas tree, said apparatus comprising:
   (a) a screen member having a first predetermined shape and a first predetermined size, said screen member being formed from a pre-selected material screen member being substantially planar when in use;
   (b) an aperture, having a second predetermined size, formed through said screen member at a predetermined location for receiving therein a trunk of said Christmas tree;
   (c) a slit formed through said substantially planar screen member beginning at an outer edge thereof and extending to an edge of a perimeter of said aperture to enable placing said substantially planar screen member around said trunk; and
   (d) a means engaging each of said substantially planar screen member and a bottom branch of a Christmas tree, said means connecting said substantially planar screen member to said Christmas tree beneath bottom branches thereof so that an upper surface of said substantially planar screen member is positioned closely adjacent a bottom surface of said bottom branches.

2. An apparatus to prevent a pet climbing up a Christmas tree, according to claim 1, wherein said first predetermined shape is selected from the group consisting of generally circular, generally hexagonal and generally octagonal.

3. An apparatus to prevent a pet climbing up a Christmas tree, according to claim 2, wherein said first predetermined shape is generally circular.

4. An apparatus to prevent a pet climbing up a Christmas tree, according to claim 1, wherein said pre-selected material is selected from the group consisting of screen wire, netting, cloth and mesh.

5. An apparatus to prevent a pet climbing up a Christmas tree, according to claim 4, wherein said screen wire is selected from the group consisting of metal and plastic.

6. An apparatus to prevent a pet climbing up a Christmas tree, according to claim 1, wherein said first predetermined size is at least sufficient to extend closely adjacent an outer perimeter of said bottom branches of said Christmas tree.

7. An apparatus to prevent a pet climbing up a Christmas tree, according to claim 1, wherein said second predetermined size of said aperture is at least sufficient to encircle said trunk of said Christmas tree.

8. An apparatus to prevent a pet climbing up a Christmas tree, according to claim 1, wherein said means for connecting said screen member to said Christmas tree beneath bottom branches thereof is at one of least of clips, string, plastic ties and clamps.

9. In combination with a decorated Christmas tree, the improvement comprising an apparatus to prevent a pet climbing up said Christmas tree, said apparatus including:
   (a) a screen member having a first predetermined shape and a first predetermined size, said screen member being formed from a pre-selected material, said screen member being substantially planar when in use;
   (b) an aperture, having a second predetermined size, formed through said substantially planar screen member at a predetermined location for receiving therein a trunk of said Christmas tree;
   (c) a slit formed through said substantially planar screen member beginning at an outer edge thereof and extending to an edge of a perimeter of said aperture to enable placing said substantially planar screen member around said trunk; and
   (d) a means engageable with each of said substantially planar screen member and a bottom branch of said Christmas tree, said means connecting said substantially planar screen member to said Christmas tree beneath bottom branches thereof so that an upper surface of said substantially planar screen member is positioned closely adjacent a bottom surface of said bottom branches.

10. The combination, according to claim 9, wherein said first predetermined shape is selected from the group consisting of generally circular, generally hexagonal and generally octagonal.

11. The combination, according to claim 10, wherein said first predetermined shape is generally circular.

12. The combination, according to claim 9, wherein said pre-selected material is selected from the group consisting of screen wire, netting, cloth and mesh.

13. The combination, according to claim 12, wherein said screen wire is selected from the group consisting of metal and plastic.

14. The combination, according to claim 9, wherein said first predetermined size is at least sufficient to extend closely adjacent an outer perimeter of bottom branches of said Christmas tree.

15. The combination, according to claim 9, wherein said second predetermined size of said aperture is at least sufficient to encircle said trunk of said Christmas tree.

16. The combination, according to claim 9, wherein said means for connecting said substantially planar screen member to said Christmas tree beneath bottom branches thereof is one of at least of clips, string, plastic ties and clamps.

17. In combination with a decorated Christmas tree, an improvement comprising an apparatus to prevent a pet climbing up said Christmas tree, said apparatus including:
   (a) a screen member being substantially planar when in use;
   (b) an aperture formed through a thickness of said substantially planar screen member at a predetermined location for receiving therein a trunk of said Christmas tree;
   (c) a slit formed through said substantially planar screen member beginning at an outer edge thereof and extending to an edge of a perimeter of said aperture; and
   (d) at least one of clips, string, plastic ties and clamps connecting said substantially planar screen member to said Christmas tree beneath bottom branches thereof so that an upper surface of said substantially planar screen member is positioned closely adjacent a bottom surface of said bottom branches.

* * * * *